United States Patent
Sato et al.

(10) Patent No.: US 8,023,105 B2
(45) Date of Patent: Sep. 20, 2011

(54) COMPACT PROJECTION EXPOSURE DEVICE AND ASSOCIATED EXPOSURE PROCESS PERFORMED BY THE DEVICE FOR EXPOSING FILM-SHAPED TAPE TO FORM CIRCUIT PATTERNS

(75) Inventors: Jin Sato, Machida (JP); Akira Nakazawa, Machida (JP); Katsumi Momose, Machida (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 492 days.

(21) Appl. No.: 11/985,941

(22) Filed: Nov. 19, 2007

(65) Prior Publication Data
US 2009/0128789 A1 May 21, 2009

(51) Int. Cl.
*G03B 27/60* (2006.01)
(52) U.S. Cl. .......................................... 355/72
(58) Field of Classification Search ..................... 355/73, 355/72, 74–76, 53
See application file for complete search history.

(56) References Cited

U.S. PATENT DOCUMENTS
5,075,718 A * 12/1991 Suzuki et al. .................... 355/50
5,781,346 A * 7/1998 Allen et al. .................... 359/649

FOREIGN PATENT DOCUMENTS
| JP | 62-293248 | 12/1987 |
| JP | 03-245651 | 10/1991 |
| JP | 03-283421 | 12/1991 |
| JP | 04/156464 | 5/1992 |
| JP | 2002-196500 | * 7/2002 |
| JP | 2005-326550 | 11/2005 |

* cited by examiner

*Primary Examiner* — Peter B Kim
*Assistant Examiner* — Chia-how Michael Liu
(74) *Attorney, Agent, or Firm* — Dilworth & Barrese, LLP.

(57) ABSTRACT

The present invention relates to provide a projection exposure device having a small volume, thereby not occupying a large installation space. The projection exposure device is configured to transfer patterns formed on a mask to a surface of film-shaped tape on an upright exposure stage by projecting the patterns onto the surface using light. This projection exposure device includes a transfer mechanism for feeding the tape to the exposure stage vertically, and a projection optical mechanism for irradiating the surface of the tape with the light. The projection optical mechanism is composed of Dyson optics located opposite the transfer mechanism across the exposure stage, and has an optical axis that is substantially perpendicular to the exposure stage.

10 Claims, 8 Drawing Sheets

COMPACT PROJECTION EXPOSURE DEVICE AND ASSOCIATED EXPOSURE PROCESS PERFORMED BY THE DEVICE FOR EXPOSING FILM-SHAPED TAPE TO FORM CIRCUIT PATTERNS

BACKGROUND OF THE INVENTION

1. Field of the Invention

The present invention relates to a projection exposure device in which circuit patterns formed on a mask are projected to a surface of a film-shaped tape in high resolution. More particularly, the present invention is directed to a projection exposure device that does not occupy a large installation space, thereby contributing to efficient use of a space in a clean room.

2. Description of the Related Art

Recently, many circuit boards for electronic products are made of film-shaped tapes. Such film-shaped tapes are mainly applied to semiconductor integrated circuits or circuits formed by the tape automated bonding (TAB) technique. When film-shaped circuit boards are fabricated, the photolithography technique is typically utilized. This technique employs an exposure process for transferring circuit patterns to a surface of a board. A typical film-shaped circuit board is, for example, 0.05 mm or less thick and 200 m long. In this exposure process, circuit patterns must be transferred to the surface of a film-shaped board in resolution of less than 10 μm. Hence, this process is extremely difficult to conduct. In order to carry out this severe exposure process, a precise transfer device and a high-resolution optical system are required. Furthermore, the exposure process needs to be performed in a dustproof environment such as a clean room.

A film exposure device used in the exposure process has the following three types; a contact exposure type device which conducts the exposure process while a mask and a film-shaped board are kept in contact with each other; a proximity exposure type device which carries out the exposure process while a mask and a film-shaped board are arranged extremely close to one another; and a projection exposure type device which performs the exposure process while a mask and film-shaped board are not in contact and which attains the high resolution transfer.

FIG. 8 shows an example of a contact exposure type device (see JP-A2005-326550). This exposure device 201 has an exposure section 202 located at the center. The device 201 feeds a film-shaped board 203 downward for each block through the center of the exposure section 202, and then, moves photo-masks 204 and 204 in the X and Y directions while rotating them, so that they are aligned. Following this, optical sources 205 and 205 irradiate masks 204 and 204 with light. A supply reel 7 located on the right side feeds the film-shaped board 203, and a take-up reel 208 on the left side winds it.

A projection exposure device is configured to allow a projection exposure optical system to project an image of a reticle (mask) to a surface of a board, and to transfer this image to the surface. The device positions a board and maintains a distance between the reticle and the board with great precision.

JP-A62-293248 has introduced an example of a projection exposure device. This device uses a telecentric projection exposure system. In addition, the device moves a board vertically, and allows the telecentric projection exposure system to project and transfer patterns formed on the reticle to the surface of the board.

However, since the telecentric projection system is expensive, a device using a non-telecentric projection exposure system has been proposed. FIG. 9 schematically shows a projection exposure device equipped with a non-telecentric projection system (see JP2798158).

Referring to FIG. 9, a projection exposure device 210 is constituted by:

an optical source 211;

a reticle (mask) 212 placed on an optical axis of light from the optical source 211;

a non-telecentric projection system 213 for projecting the image on the reticle 212 to an upright projection plane;

a transfer mechanism 215 for feeding a film-shaped board 214 vertically for each block, and positions it on the projection plane;

a sensor 216 for sensing the horizontal displacement of the board 214 from the projection plane; and a controller 217 for moving the reticle 212 and/or one or more lenses of projection system on the optical axis, based on the sensing result.

In the projection exposure device 210, the non-telecentric projection system 213 is placed such that its optical axis is parallel to a floor. Even if lenses making up the projection system 213 are displaced accidentally due to a mechanical error or environmental variation, the projection exposure device 210 can correct this displacement by moving the lenses and/or the reticle 212. Therefore, this device hardly causes errors during the exposure process.

In addition to the above device, a projection exposure device in which a non-telecentric projection system is placed vertically has been known.

On the other hand, JP2892079 has disclosed a method for pinching a tape-shaped board between a plate and an exposure stage in order to fix it firmly on the stage during the exposure process. In addition, JP2793000 has conceived a method for fixing a board on a circular exposure stage by using multiple electromagnetic valves.

However, such projection exposure devices have the following disadvantages.

In the exposure device 201 of JP-A2005-326550 as shown in FIG. 8, the film-shaped board 203 is fed from the supply reel 207 placed on the right side, and is wound by the take-up reel 208 placed on the left side. Thus, since the transfer mechanism has a long lateral length, its installation space ends up large.

In the projection exposure device of JP2798158 as shown in FIG. 9, the optical axis of the non-telecentric projection system 213 extends laterally. Therefore, it needs to occupy a large lateral space. As far as judging from FIG. 9, the projection system 213 of FIG. 9 does not seem to occupy such a large space. However, in fact, the projection system is made up of 20 lenses or so in order to achieve high resolution. Thus, its lateral length reaches 2.5 m or more. Hence, there needs to be a large space in a clean room to install this device.

Also, the projection exposure device of JP-A62-293248, which is the telecentric projection exposure system, is difficult to shrink.

Even if a non-telecentric projection system is installed in an upright position, its installation space does not shrink. This is because the transfer mechanism for transferring a board is, in turn, enlarged laterally. In addition, since standing high, the system may block air flow, so that environment in a clean room is worsened.

On the other hand, a board tends to be thinner for the purpose of enhancing the performance of an electronic circuit board. As a board is thinner, the board is more likely to be warped due to stress or variation in temperature or moisture during a fabrication process. In the exposure process, a resist is applied to the surface of a board, and the board is then baked. Hence, a board inevitably undergoes stress due to thermal expansion and contraction. In addition, when a board is fed from a reel, the board is subjected to different environment. Then, the board may be warped between its center and both side edges or between the center and areas outside perforations.

Suppose the case where a warped board is fixed to an exposure stage. Although the center of this board is in contact with the exposure stage, its both edges may float off the stage. In this case, the board cannot be fixed thereon firmly, which may affect the exposure process.

In order to overcome this disadvantage, JP-A2892079 has disclosed a structure where a plate presses a board against an exposure stage. However, in this structure, a board may be damaged. In addition, even if a board is pressed, it does not always keep in surface contact with an exposure stage. In fact, it may partially float off the stage.

Taking the above disadvantages, the present invention has been conceived. An object of the present invention is to provide a projection exposure device having a small volume, thereby not occupying a large installation space. An additional object of the present invention is to present projection exposure device and process, by which a board can make surface contact with an exposure stage.

SUMMARY OF THE INVENTION

According to a first aspect of the present invention, there is provided, a projection exposure device, which is configured to transfer patterns formed on a mask to a surface of a film-shaped tape on an upright exposure stage by projecting the patterns onto the surface of the tape using light, and which includes:

a1) a transfer mechanism for feeding the tape to the exposure stage vertically; and a2) a projection optical mechanism for irradiating the surface of the tape with the light, the projection optical mechanism including Dyson optics being located opposite the transfer mechanism across the exposure stage;

the Dyson optics having an optical axis that is substantially perpendicular to the exposure stage.

In the above projection exposure device, the transfer mechanism feeds the film-shaped tape for each block vertically and along the exposure stage. Then, the tape and the mask are aligned. Finally, the optical source irradiates the surface of the tape with the light containing ultraviolet light through the Dyson optics. Consequently, the patterns on the mask are formed on the surface of the tape.

The transfer mechanism and the projection optical mechanism are arranged opposite each other across the exposure stage. This configuration enables the miniaturization of the device.

According to a second aspect of the present invention, there is provided, the projection exposure device according to the first aspect in which the exposure stage is permitted to move in substantially parallel to the optical axis of the Dyson optics.

In this configuration, the light from the Dyson optics can always focus on the surface of the tape by travelling the exposure stage on the optical axis in accordance with the thickness of the tape.

According to a third aspect of the present invention, there is provided, the projection exposure device according to the first aspect including:

a3) a tape surface location measurement unit for pinpointing a location of the surface of the tape on the optical axis, the tape surface location measurement unit being allowed to move to or escape from a region between the Dyson optics and the exposure stage;

a4) a mark capture unit for capturing an image indicating how long the tape shifts from the optical axis in directions perpendicular to the optical axis, the mark capture unit being allowed to move to or escape from the region between the Dyson optics and the exposure stage; and a5) a controller for allowing the exposure stage to move in parallel to the optical axis, based on the location of the surface of the tape which has been pinpointed by the tape surface location measurement unit, and for allowing the mask to move, based on the image which has been captured by the mark capture unit.

In this configuration, with the tape surface position measurement unit and the mark capture unit, the position of the surface of the tape and the positional relationship between the tape and the mask can be acquired. The exposure stage and the optical axis are moved based on the acquired information, whereby the exposure process can be carried out with great precision.

According to a fourth aspect of the present invention, there is provided, the projection exposure device according to the first aspect in which the transfer mechanism includes:

a6) a supply reel for feeding the tape;

a7) first and second supply side guide rollers for guiding the tape from the supply reel;

a8) a first tension adjuster for adjusting a tension of a portion of the tape that ranges between the first and second supply side guide rollers;

a9) first and second transfer rollers for feeding, along the exposure stage, the tape from the second supply side guide roller, the first and second transfer rollers being arranged above and below the exposure stage, respectively;

a10) first and second winding side guide rollers for guiding the tape from the second transfer roller;

a11) a second tension adjuster for adjusting a tension of a portion of the tape that ranges between the first and second winding side guide rollers; and a12) a take-up reel for winding the tape from the second winding side guide roller.

Furthermore, the supply reel, the first and second supply side guide rollers, the first tension adjuster, and the first transfer roller are all located above the second transfer roller, the first and second winding side guide rollers, the second tension adjuster, and the take-up reel.

With this arrangement, distances between the supply reel and the first transfer roller and between the second transfer roller and the take-up reel can be made short. In addition, a distance between the supply reel and the take-up reel can also be shortened.

According to a fifth aspect of the present invention, there is provided, the projection exposure device according to the first aspect in which the exposure stage includes:

a13) one or more central suction holes for applying first sucking power to a center region of the tape in such a way that the center region of the tape is drawn to the exposure stage; and a14) one or more side suction holes for applying second sucking power to side regions of the tape in such a way that the side regions of the tape are drawn to the exposure stage, the second sucking power being greater than the first sucking power.

In this configuration, the central suction holes draw the center region of the tape by means of the first sucking power. In this case, however, both side regions of the tape may float off the exposure stage if the tape is warped. Therefore, the side suction holes draw the side regions of the tape by means of the second sucking power, which is greater than the first sucking power. This makes it possible to fix the tape on the exposure stage firmly, and thus, to transfer the circuit patterns on the mask to the surface of the tape precisely.

According to a sixth aspect of the present invention, there is provided, the projection exposure device according to the fifth aspect further including:

a15) a first decompressor for producing the first suction power, the first decompressor being coupled to the central suction holes, and a16) one or more second decompressors for producing the second suction power, the second decompressors being coupled to the side suction holes.

In this configuration, the first decompressor decreases an internal space communicating with the central suction holes. In response, the central suction holes suck the center region of the tape and surrounding air. The second decompressors decrease the internal spaces communicating the side suction holes. In response, the side suction holes suck the side regions of the tape and surrounding air. Due to the fact that each of the second decompressors has greater sucking power than that of the first decompressor, the side suction holes can suck a larger volume of air than the central suction holes do. Accordingly, even if the tape is warped and its side regions are farther away from the exposure stage than the center region, the side regions are fixed on the exposure stage firmly.

According to a seventh aspect of the present invention, there is provided, the projection exposure device according to the seventh aspect in which each of the second decompressors includes a decompression pump coupled to the side suction holes, and a decompression tank coupled to the side suction holes and to the decompression pump and having internal pressure to be decreased by the decompression pump.

In this configuration, the decompression tank of which internal pressure has been lowered by the decompression pump produces the second sucking power, until the internal pressure returns to the atmospheric pressure. The second decompression pump naturally produces sucking power. However, thanks to a combination use of the second decompression pump and the decompression tank, greater sucking power, that is, second sucking power can be generated. Thus, the suction holes can suck a large volume of air, so that the side regions of the warped tape are fixed on the exposure stage firmly.

According to an eighth aspect of the present invention, there is provided, the projection exposure device according to the fifth aspect, further including a blower for sending out gas to the tape on the exposure stage from a side opposite to the central and side suction holes. The blower starts outputting gas, right after the center region and the side regions of the tape are drawn to the exposure stage. The gas may be air or nitrogen gas that is inertness toward the tape. The tape is moved toward the exposure stage by the gas from the blower. Hence, the distance between the tape and the exposure stage is shortened. This involves the decrease in the volume of air therebetween. In other words, the volume of air that the first and second decompressors need to suck is decreased. This makes it possible to attain prompt sucking of the tape, and to decrease the sucking power produced by the first and second decompressors According to a ninth aspect of the present invention, there is provided, the projection exposure device according to the fifth aspect in which if the tape has at least one pair of perforation lines each of which is made up of a plurality of holes arranged in a feeding direction of the tape, then the center region spans between the perforation lines, and each of the side regions spans between one of the perforation lines and a nearer one of side edges of the tape, and unless the tape has perforation lines, each of the side regions occupies 10% or less of a whole surface area of the tape.

According to a tenth aspect of the present invention, there is provided, an exposure process by which a projection exposure device transfers patterns formed on a mask to a first surface of a film-shaped tape on an exposure stage while feeding the tape for each block, the projection exposure device including first decompression pumps, decompression tanks coupled to the corresponding first decompression pumps, and a second decompression pump, the exposure process including:

b1) decreasing internal pressure of the decompression tanks by using the corresponding first decompression pumps;

b2) drawing a center region of a first surface of the tape to the exposure stage by means of first sucking power that is produced by the second decompression pump; and b3) drawing side regions of the first surface of the tape to the exposure stage by means of second sucking power that is produced by the first pumps and the decompression tanks, the second sucking power being greater than the first sucking power.

During the above process, the center region of the tape is drawn to the exposure stage by means of the first sucking power. Furthermore, even if the tape is warped and its side regions float off the exposure stage, the side regions are fixed to the exposure stage by means of the second sucking power, which is greater than the first sucking power. With this exposure process, the circuit patterns on the mask can be transferred to the surface of the tape precisely.

According to an eleventh aspect of the present invention, there is provided, the exposure process according to the tenth aspect further including sending out gas to the first surface of the tape by using a blower, after drawing the side regions of the second surface of the tape to the exposure stage.

During this process, the tape which has been away from the exposure stage is made to approach the exposure stage. It is preferable that the blower stops the gas prior to the exposure step in order not to affect this step.

The above described projection exposure device and process has achieved the following effects.

(1) The projection optical mechanism employs the Dyson optics. Thus, its size is compact, and the number of components, such as a lens, prism and mirror, is reduced. In addition, the transfer mechanism feeds the film-shaped tape vertically. This enables the device to be made compact. As a result, the projection exposure device does not occupy a large space in a clean room.

(2) Because of its compact size, the projection exposure device hardly affects air flow in a clean room, and does not constitute an obstacle within a working area. This leads to the improvement of the working environment in a clean room.

(3) The exposure step can be carried out, while the center region and the side regions of the tape are in surface contact with the exposure stage. This contributes to the improvement of precision of the exposure device and exposure process.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

First Embodiment

A description will be given below, of a projection exposure device according to a first embodiment of the present invention, with reference to FIGS. 1 to 3.
(Structure of Projection Exposure Device 20)

Figure 1:
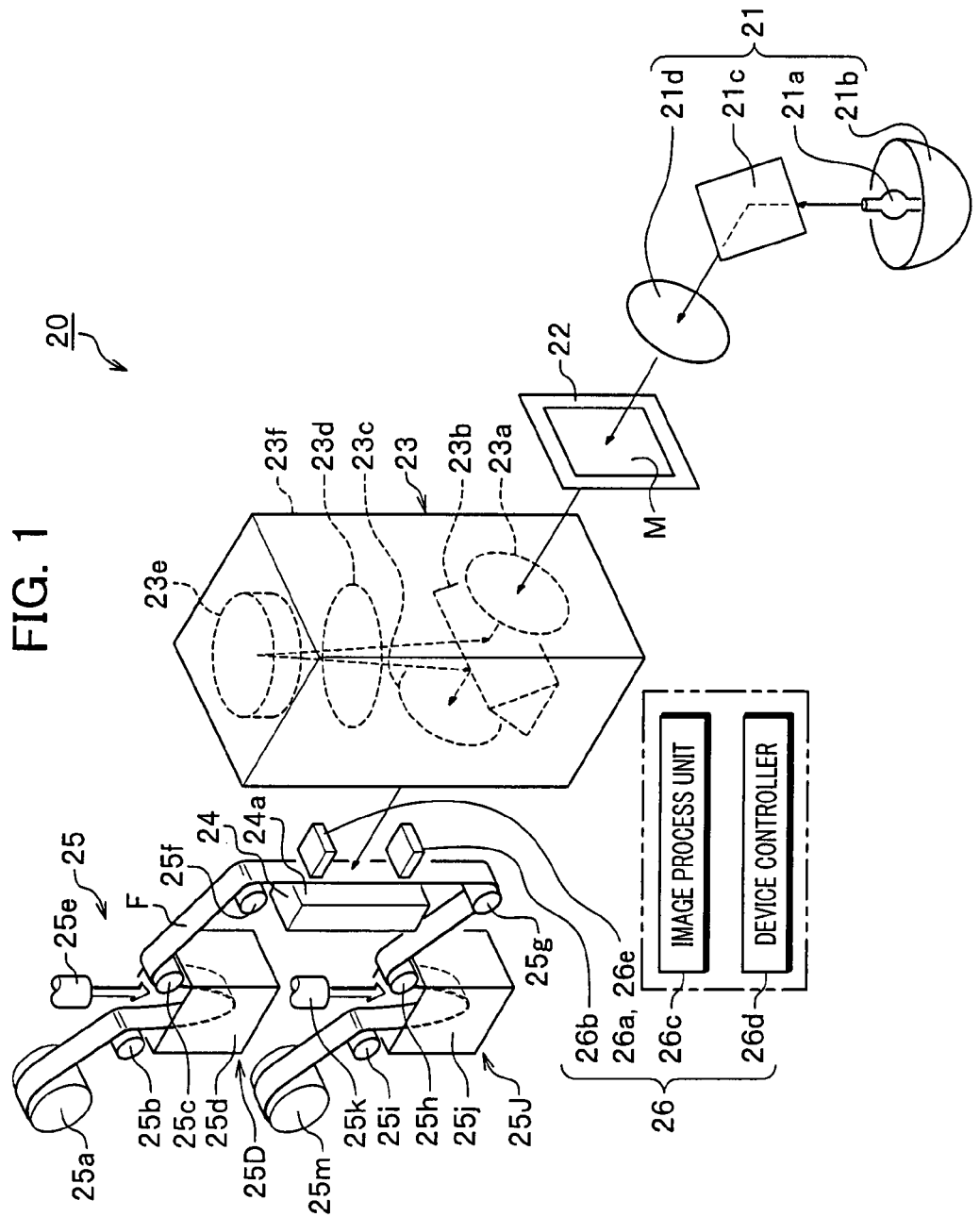
FIG. 1 is a perspective view depicting a projection exposure device according to a first embodiment of the present invention.

Referring to FIG. 1, a projection exposure device 20 of the first embodiment is constituted by the following components:
an optical source mechanism 21 (projection optical mechanism);
a mask holding frame 22;
a Dyson optics 23 (projection optical mechanism) located on an axis of light from the optical source mechanism 21 and a predetermined distance away from the mask holding frame 22;
an exposure stage 24; and
a transfer mechanism 25.

The mask holding frame 22 keeps a mask M on the axis of the light from the optical source mechanism 21. The exposure stage 24 is placed on an optical axis of light outputted from the Dyson optics 23. The transfer mechanism 25 is located close to the exposure stage 24, and feeds a film-shaped tape F for each block vertically. The projection exposure device 20 has a controller 26 for aligning alignment marks (not shown) on the tape F and on the mask M prior to an exposure step.

In the projection exposure device 20, the transfer mechanism 25 feeds the tape F for each block at regular intervals, and a positioning unit (not shown) places the tape F to a predetermined location. The optical source mechanism 21 irradiates the mask M with light of a predetermined wavelength containing ultraviolet light during a prescribed period. Upon irradiation, circuit patterns formed on the mask M are projected onto a surface of the tape F which is placed in an upright position along the exposure stage 24. As a result, the circuit patterns are transferred to the surface of the tape F, so that an electric circuit board is formed.

The optical source mechanism 21 includes an ultraviolet lamp 21a for emitting the light of the predetermined wavelength containing ultraviolet light, an elliptic mirror 21b, a reflecting mirror 21c and a fly eye lens 21d. The elliptic mirror 21b has the ultraviolet lamp 21a at the center, and reflects light from the ultraviolet lamp 21a. The reflecting mirror 21c curves an optical path of light reflected by the elliptic mirror 21b. The fly eye lens 21d regulates an illuminance distribution of the light reflected by the reflecting mirror 21c, and irradiates mask M with the light from the ultraviolet lamp 21a. The ultraviolet lamp 21a is adapted to constantly emit the light. When a shutter mechanism (not shown) is opened, the mask M is exposed to the light.

The mask M is supported in an upright position by the mask holding frame 22, and it has thereon the circuit patterns to be projected to the surface of the tape F. Moreover, the mask M has an identification mark and the alignment mark to be registered with an alignment mark on the tape F. The tape F is, for example, 12.5 μm thick.

The light passes through the mask M and, then enters the Dyson optics 23.

The Dyson optics 23 is composed of:
an entrance side convex lens 23a and an exit side convex lens 23c, both centers of which are arranged on the optical axis;
a prism reflector 23b located between the entrance side convex lens 23a and the exit side convex lens 23c;
a reflection side convex lens 23d and a concave reflecting mirror 23e that both are arranged above the prism reflector 23b; and
a lens body 23f.

The light that has entered the Dyson optics 23 passes through the entrance side convex lens 23a. Then, it is reflected by the prism reflector 23b, and passes through the reflection side convex lens 23d. Following this, the light is reflected by the concave reflecting mirror 23e. The light passes through the reflection side convex lens 23d again, and is then reflected by the prism reflector 23b. Finally, the light passes through the exit side convex lens 23c, and reaches the surface of the tape F. This Dyson optics 23 has a smaller installation space than any other optics, thus contributing to the miniaturization of the device 20.

The exposure stage 24 has an upright stage surface (vertical surface) 24a, and this surface is perpendicular to the optical axis of the light from the Dyson optics 23. The exposure stage 24 is adapted to move in parallel to the optical axis, that is, in the directions of an arrow "24b" of FIG. 2 in order to focus the light on the stage surface 24a of the stage 24. Furthermore, the exposure stage 24 is positioned a predetermined distance away from the center of the Dyson optics 23.

The exposure stage 24 is coupled to a pipe of a vacuum pump, and sucks the tape F to thereby fix it thereon. When one block of the tape F, which corresponds to one exposure area, is fed to the exposure stage 24, mark capture units 26a and 26b (as will be described later) acquire a positional relationship between alignment marks on the tape F and on the mask M. Following this, the position of the mask M is adjusted based on the acquired positional relation in such a way that the misaligned amount between both alignment marks are decreased to zero. After the adjustment, the mask M is exposed to light.

Figure 2:
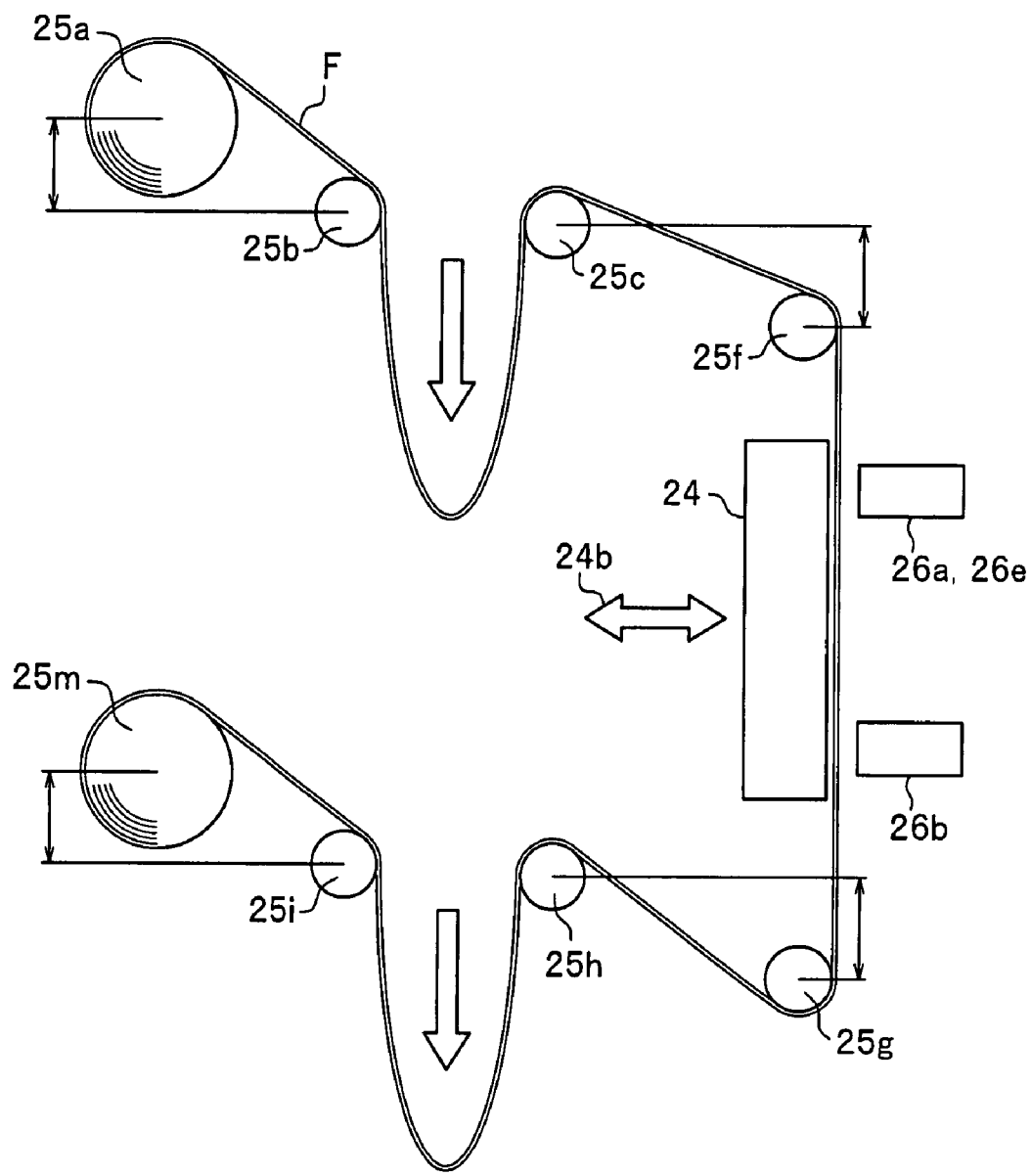
FIG. 2 is a side view depicting a transfer mechanism of the projection exposure device.

Referring to FIGS. 1 and 2, the transfer mechanism 25 includes a first air dancer 25D and a second air dancer 25J as first and second tension adjusters for adjusting a tension of the tape F. In addition, the transfer mechanism 25 is configured to feed the film-shaped tape F downward, while the tape F is running close to the stage surface 24a of the exposure stage 24. The transfer mechanism 25 includes, on the supply side, a supply reel 25a for feeding the tape F, first and second guide rollers 25b and 25c for guiding the tape F from the supply reel 25a, and the first air dancer 25D (box 25d) for adjusting the tension of portion of the tape F which ranges between first and second guide rollers 25b and 25c. In addition, the transfer mechanism 25 includes, on the winding side, third and fourth guide rollers 25h and 25i, the second air dancer 25J (box 25j) for adjusting the tension of portion of the tape F which ranges between the third and fourth guide rollers 25h and 25i, and a take-up reel 25m for winding the tape F from the fourth guide roller 25i.

Furthermore, the transfer mechanism 25 includes, on the supply side, a first transfer roller 25f which feeds the tape F to the stage surface 24a of the exposure stage 24 and which is located above the exposure stage 24. The transfer mechanism 25 includes, on the winding side, a second transfer roller 25g which feeds the tape F having passed through the stage surface 24a and which is located below the exposure stage 24. The tape F is contained in the boxes 25d and 25j of the first and second air dancers 25D and 25J, respectively in order to prevent the tape F from being affected from surroundings. The first and second air dancers 25D and 25J adjust the tension of the tape F without varying its feeding amount. Specifically, the tension of tape F which is created by being pulled by rollers is relaxed due to its weight within each dancer.

The supply reel 25a, the first and second guide rollers 25b and 25c, the first and second transfer rollers 25f and 25g, the third and fourth guide rollers 25h and 25i and a take-up reel 25m are driven by corresponding motors. In order to adjust the feeding amount of the tape F, a control motor $25f_2$ (see FIGS. 3A and 3B) of the first transfer roller 25f and a control motor $25g_2$ of the second transfer roller 25g may be implemented by a stepping motor or servo motor. A device controller 26d sends, to the control motor $25f_2$ or the control motor $25g_2$, a signal indicating a feeding amount of the one block. As shown in FIG. 2, in the transfer mechanism 25, the supply reel 25a, the first and second guide rollers 25b and 25c, the first transfer roller 25f are arranged above the second transfer roller 25g, the third and fourth guide rollers 25h and 25i and the take-up reel 25m, respectively.

As is clear from FIG. 2, the tape F is fed obliquely downward from the supply reel 25a to the first guide roller 25b in the transfer mechanism 25. In other words, the rotational axis of the supply reel 25a is located higher than that of the first guide roller 25b. The second guide roller 25c is located as high as or lower than the first guide roller 25b. In addition, the tape F is fed obliquely downward from the second guide roller 25c to the first transfer roller 25f. In other words, the rotational axis of the second guide roller 25c is located higher than that of the first transfer roller 25f. Moreover, the tape F is fed obliquely upward from the second transfer roller 25g to the third guide roller 25h. In other words, the rotational axis of the third guide roller 25h is located higher than that of the second transfer roller 25g. The fourth guide roller 25i is located as high as or higher than the third guide roller 25h. The fourth guide roller 25i and the take-up reel 25m are arranged such that the tape F is fed obliquely upward therebetween. In other words, both are arranged such that the rotational axis of take-up reel 25m is located higher than that of the fourth guide roller 25i.

Owing to the first and second transfer rollers 25f and 25g in addition to the arrangements between the supply reel 25a and the first transfer roller 25f and between the second transfer roller 25g and the take-up reel 25m, the transfer mechanism 25 can feed the tape F appropriately without pinching it.

Furthermore, the second and third guide rollers 25c and 25h can be displaced on their rotational axes in order to adjust the position of both edges of the tape F. Also, the first and second transfer rollers 25f and 25g can adjust the feeding amount of the tape F.

The transfer mechanism 25 feeds the tape F from the supply reel 25a to the first transfer roller 25f in substantial parallel to the floor. Then, the mechanism 25 feeds the tape F from the first transfer roller 25f to the second transfer roller 25g vertically. Finally, it feeds the tape F from the second transfer roller 25g to the take-up reel 25m in substantially parallel to the floor. This arrangement attains the size reduction in the installation space.

Before the exposure step and after feeding of the tape F by one block, the controller 26 aligns the alignment mark on the tape F with that on the mask M. The controller 26 includes the mark capture units 26a and 26b, and an image process unit 26c. Specifically, each of the mark capture units 26a and 26b is composed of a CCD camera and a half mirror (not shown). The CCD camera captures images of both alignment marks. The image process unit 26c receives the image signals from the mark capture units 26a and 26b. Upon receipt of the signals, the unit 26c treats with them and, then outputs the treated signals. The treatment of the image process unit 26c is to produce the images of the alignment marks on the tape F and on the mask M, and to determine the misaligned amount therebetween, based on the images. The controller 26 allows the mask M to move until the misaligned amount becomes zero. Furthermore, the controller 26 includes the device controller 26d for sending/receiving control signals to or from the second guide roller 25c, the first and second transfer rollers 25f and 25g and the third guide roller 25h of the transfer mechanism 25. If the misaligned amount exceeds a preset threshold, then the device controller 26d allows the second guide roller 25c and the third guide roller 25h to be displaced on their rotational axes and the first and second transfer rollers 25f and 25g to vary their feeding amount. As a result, the feeding amount and angle of a next block of the tape F are corrected.

The controller 26 further includes a tape surface location measurement unit 26e composed of a contact or noncontact type measurement tool for measuring a position of the surface of the tape F. The tape surface location measurement unit 26e measures how long the surface of the tape F shifts from a reference location (focal point) on the exposure stage 24 which is positioned on the optical axis of the light from the Dyson optics. The exposure stage 24 is moved by the shifting distance, whereby the light is focused onto the surface of the tape F. The mark capture units 26a and 26b and the tape surface location measurement unit 26e are positioned close to the optical axis upon measurement, and escape from the axis prior to the exposure step. Moreover, the controller 26 adjusts a scale of an image of the mask M which is projected on the surface of the tape F by the Dyson optics 23, and controls the open/close of the shutter mechanism (not shown), as necessary.

Figure 3A:
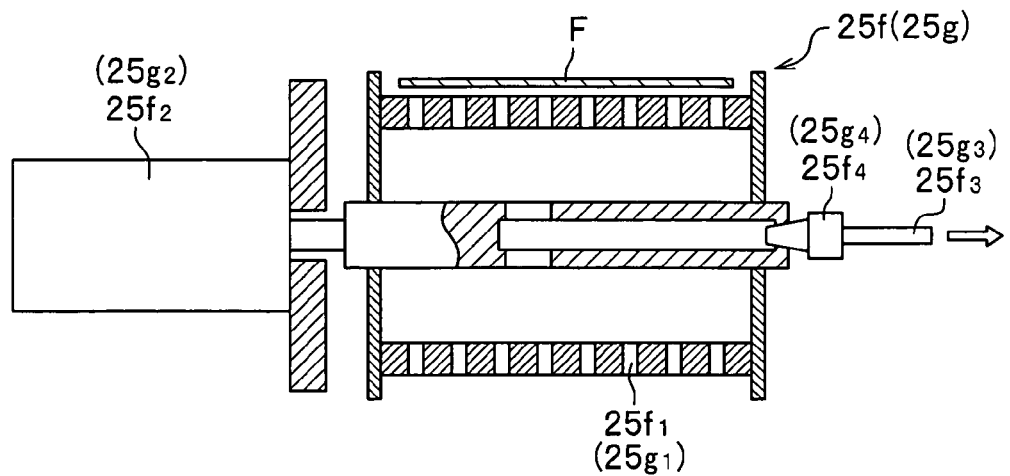
FIG. 3A is a cross-section view depicting a first transfer roller of the transfer mechanism.
Figure 3B:
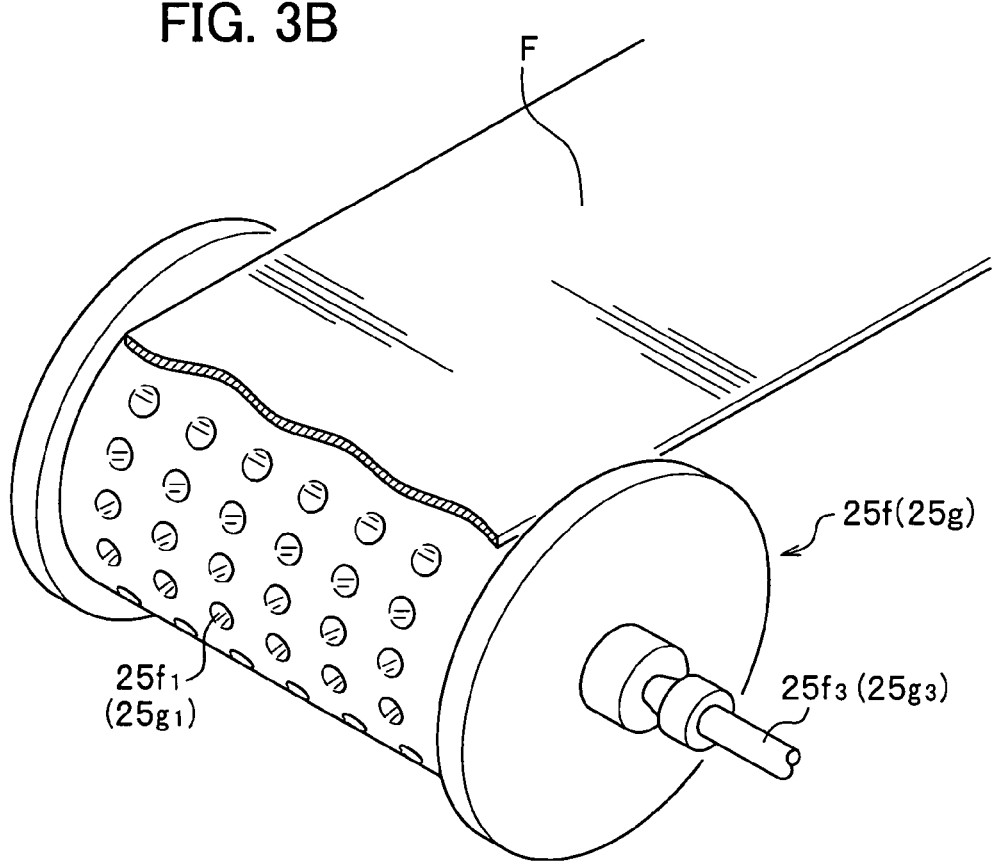
FIG. 3B is a perspective view depicting the first transfer roller.

Referring to FIGS. 3A and 3B, the first transfer roller 25f has multiple small holes $25f_1$ formed on the whole surface. An end of the first transfer roller 25f is coupled to the control motor $25f_2$, and the other is coupled to a vacuum pipe $25f_3$ of the vacuum pump (not shown) through a rotatable joint $25f_4$. While the control motor $25f_2$ is rotating, the first transfer roller 25f keeps sucking the tape F for the purpose of preventing the tape F from slipping over the surface of the roller. Note that the second transfer roller 25g has the same structure as that of this first transfer roller 25f. Moreover, it is preferable that all of the rollers 25b to 25i employ the above structure.

(Operation of Projection Exposure Device 20)

A description will be given below, of an operation of the projection exposure device 20.

While the tape F is being fed to the exposure stage 24 for each block, the projection exposure device 20 controls the driving of the first and second transfer rollers 25f and 25g and the second and third guide rollers 25c and 25h. At the same time, the tape F is being guided by the first and second guide rollers 25b and 25c and the tension of the tape F is being adjusted by the first air dancer 25D. Therefore, the tape F which is fed to the exposure stage 24 always has a proper tension. Likewise, the tape F is guided by the third and fourth guide rollers 25h and 25i, and its tension is adjusted by the second air dancer 25J. Therefore, the tape F which is fed from the exposure stage 24 always has a proper tension.

The transfer mechanism 25 drives the supply reel 25a and the first guide roller 25b to thereby regulate the feeding amount at which the tape F is fed to the interior of the first air dancer 25D. In addition, the transfer mechanism 25 drives the fourth guide roller 25i and the take-up reel 25m to thereby regulate a feeding amount at which the tape F is fed to the interior of the second air dancer 25J.

The feeding amount at which the tape F is fed from the supply reel 25a, the feeding amount at which the tape F is fed to the exposure stage and the feeding amount at which the tape F is wound by the take-up reel 25m are not related to one another. Thus, the first air dancer 25D and the second air dancer 25J can operate independently.

When the projection exposure device 20 feeds the tape F to the exposure stage 24, the tape F is sucked onto the exposure stage 24, and fixed thereon. Following this, the mark capture units 26a and 26b and the tape surface location measurement unit 26e move to an area between the Dyson optics 23 and the exposure stage 24. The mark capture units 26a and 26b capture the images of alignment marks on the tape F and on the tape F in order to pinpoint their positions. The image process unit 26c determines the misaligned amount between the tape F and the mask M. The device controller 26d moves the mask M based on the misaligned amount, so that the misaligned amount is substantially zero. The tape surface location measurement unit 26e measures the position of surface of the tape F. The exposure stage 24 moves in parallel to the optical axis while sucking the tape F in order to cancel the shifting amount of the focal point.

The mark capture units 26a and 26b escape from the area between the Dyson optics 23 and the exposure stage 24 after capturing the images. The optical source mechanism 21 irradiates the mask M with ultraviolet light, and the circuit patterns on the mask M are then projected onto the surface of one block of the tape F through the Dyson optics 23. After the projection, the circuit patterns are transferred to the surface of the tape F, so that a tape-shaped electric circuit board is formed.

The tape F is released from the exposure stage 24, and the tape F is fed for one block. This exposure step repeats until the tape F runs out.

The transfer mechanism 25 can feed the tape F appropriately, and does not occupy a large area. In addition, the Dyson optics 23 and the optical source mechanism 21 in the projection optical mechanism have a short lateral length. Therefore, the projection exposure device 20 has a small installation space.

Up to this point, the projection exposure device according to the first embodiment and the exposure process performed by the device have been described. However, the exposure device of the present invention is not limited to that of the first embodiment. For example, the first and second tension adjusters may adjust the tension of the tape F by means of air blow rather than the weight of the tape F. Moreover, the tape F may have perforations on both sides. In this case, the feeding amount of the tape F may be determined by using the perforations and a photo interrupter. The edges of the perforations may be sensed when the tape F is positioned.

Second Embodiment (Structure of Projection Exposure Device)

Figure 4:
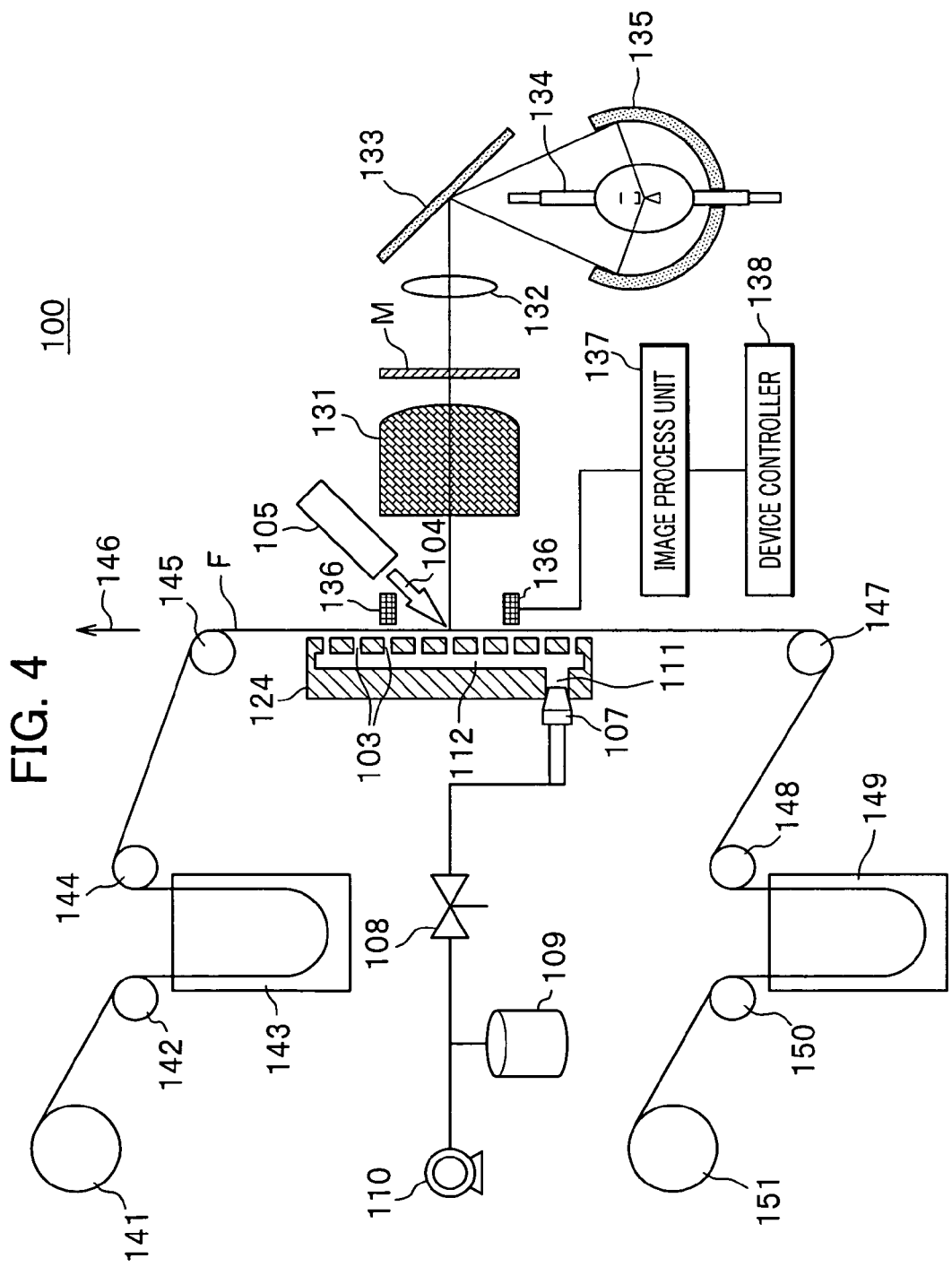
FIG. 4 is a side view depicting a projection exposure device according to a second embodiment of the present invention.

Referring to FIG. 4, a projection exposure device 100 according to a second embodiment of the present invention is constituted by the following components:

an exposure stage 124 to which a tape F is sucked;

a decompressor coupled to the exposure stage 124, for drawing the tape F to the exposure stage 124;

a blower 105 for blowing out air 104 toward the tape F on the exposure stage 124;

a transfer section for feeding the tape F to the exposure stage 124;

an optical section for irradiating the tape F on the exposure stage 124 with light in order to transfer an image of circuit patterns on the tape F; and a control section for controlling the whole projection exposure device 100.

On the exposure stage 124, multiple side suction holes 103 are formed, and all the side suction holes 103 communicate with a side port 111 through a connection hole 112. The decompressor includes a joint 107 inserted into the side port 111, a three-way valve 108 coupled to the joint 107, and a decompression pump 110 and a decompression tank 109 which both are coupled to the three-way valve 108. With this three-way valve 108, the joint 107 is connected to the external or to both the decompression tank 109 and the decompression pump 110.

The transfer section includes:

a supply reel 141 around which the tape F is wound;

a take-up reel 151 for winding the tape F;

air dancers 143 and 149 that adjust a tension of the tape F;

guide rollers 142, 144, 148 and 150 and transfer rollers 145 and 147 that all guides the tape F; and transfer rollers 145 and 147.

The supply reel 141 is located higher than the guide roller 142, and the guide rollers 142 and 144 are arranged directly above the air dancer 143. Because of this arrangement, the tape F can be fed from the supply reel 141 to the air dancer 143 smoothly. The transfer roller 145 is located directly above the exposure stage 124 and lower than the guide roller 144, and the transfer roller 147 is located directly below the exposure stage 124. Due to this structure, the tape F can be fed close to the exposure stage 124 in the vertical direction 146 smoothly. The tape F is placed opposite the side suction holes 103. The guide rollers 148 and 150 are arranged directly above the air dancer 149, and the take-up reel 151 is located higher than the guide roller 150. Owing to this arrangement, the tape F can be fed to the guide roller 148 to the take-up reel 151 through the air dancer 149 smoothly.

The air dancers 143 and 149 constantly adjust the tensions of the tape F between the guide rollers 142 and 144 and between the guide rollers 148 and 150, respectively.

The optical section includes:

a lamp 134 for emitting light of a predetermined wavelength containing ultraviolet light;

an elliptic mirror 135 for reflecting the light from the lamp 134;

a reflection mirror 133 for curving the optical path of the light from the elliptic mirror 135;

a fly eye lens 132 placed on the optical axis, for regulating the distribution of light intensity;

a mask M having circuit patterns thereon, placed on the optical axis and supported by a mask holding frame; and an exposure optics (Dyson optics) 131 for projecting the circuit patterns on the mask M to a surface of the tape F.

The control section includes capture units 136 and 136, an image process unit 137, and a device controller 138. The capture units 136 and 136 are placed close to the exposure stage 124 and the tape F, and captures images of an alignment mark formed on the tape F and an alignment mark projected from the mask M to the tape F. The image process unit 137 converts the captured images of the alignment marks into data of a format that can be treated by the device controller 138. The device controller 138 positions the tape F on the exposure stage 124 based on the data received from the image process unit 137, and counts the number of the exposure steps. If the counted number reaches a preset value, then the device controller 138 terminates the exposure process. In addition, the device controller 138 controls other operations of the projection exposure device 100.

(Suction by Exposure Stage)

Figure 5A:
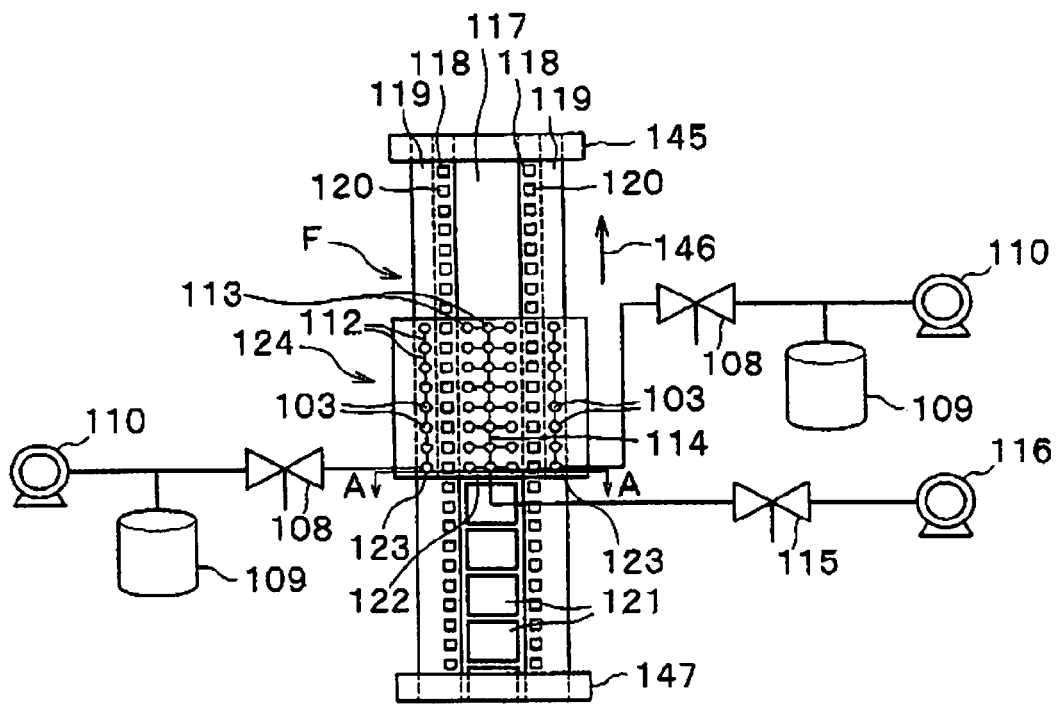
FIG. 5A is a perspective view depicting an exposure stage of the projection exposure device while a tape is placed thereon.

Referring to FIG. 5A, the tape F is a work of, for example, 100 mm wide and having perforation holes 120 on both sides. The perforation holes 120 on each side, all of which have the same size, are arranged at regular intervals at 1 mm to 2 mm inwardly from the edge. On the exposure stage 124, the tape F is fed in the vertical direction 146 by the transfer rollers 145 and 147. On the center of the tape F, a center region 117 to which the circuit patterns are to be formed is provided. The center region 117 has, on both sides, hole regions 118 each of which is provided with the perforation holes 120. On the outer sides of the hole regions 118, side regions 119 of 1 mm to 2 mm wide are formed and they extend to the edges of the tape F.

Figure 5B:
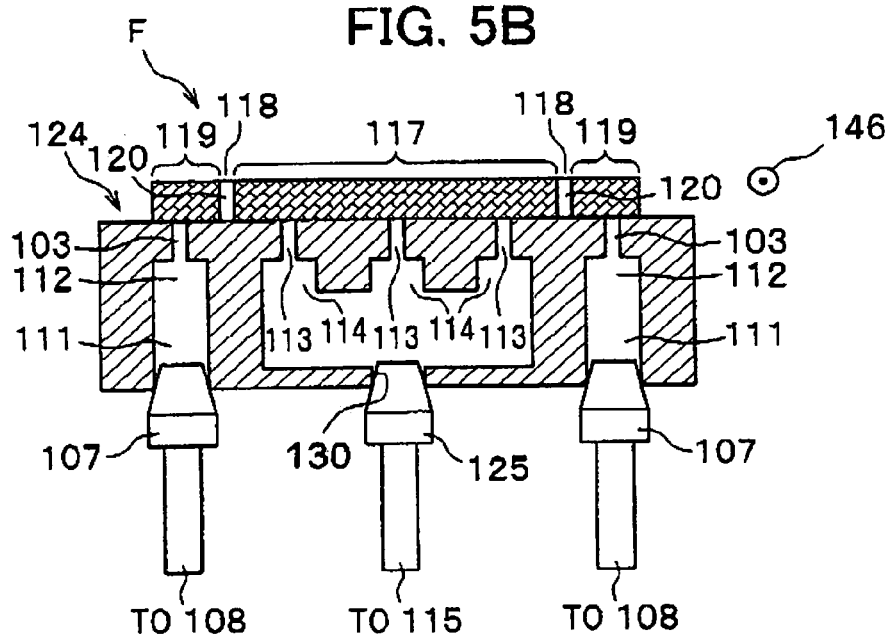
FIG. 5B is a cross-sectional view of FIG. 5A taken along a line A-A.

Referring to FIGS. 5A and 5B, the center region 117 and the side regions 119 of the tape F are sucked onto the exposure stage 124. Further, the center region 117 is sucked onto a center part 122 of the exposure stage 124, and the side regions 119 are sucked onto side parts 123 of the exposure stage 124. The center part 122 has multiple central suction holes 113 formed on the whole surface, and the central suction holes 113 communicate with the central port 130 through corresponding connection holes 114. Each of the side parts 123 is provided with multiple side suction holes 103 formed on the whole surface, and the side suction holes 103 communicates with the side ports 111 through the corresponding connection holes 112.

The central port 130 and the side ports 111 are coupled to corresponding decompressors. Further, the central port 130 is coupled to a first decompressor including a joint 125 inserted into the central port 130, a three-way valve 115 coupled to the joint 125, and a decompression pump 116 coupled to the three-way valve 115. With the three-way valve 115, the joint 125 can be connected to any one of the external and the decompression pump 116. Each of the side ports 111 is coupled to a second decompressor including a joint 107 inserted into the side port 111, a three-way valve 108 coupled to the joint 107, and a decompression pump 110 and a decompression tank 109 which both are coupled to the three-way valve 108. The perforation holes 120 in the tape F face neither of the central suction holes 113 nor the side suction holes 103. Therefore, air does not enter the central suction holes 113 and the side suction holes 103 from the outside through the perforation holes 120. Consequently, the tape F is sucked onto the exposure stage 124 firmly.

Now, an operation of each of the decompression tanks 109 will be described below. The decompression tank 109 can reduce its internal pressure by using the decompression pump 110. When the three-way valve 108 connects the side suction holes 103 and the decompression tank 109 on the condition that the internal pressure is kept negative, the decompression tank 109 sucks air flowing around the exposure stage 124. Meanwhile, the decompression pump 110 is connected to the side suction holes 103, and sucks air around the exposure stage 124 as well. In this way, the air sucked from the side suction holes 103 is increased by a combination use of the decompression tanks 109 and the decompression pumps 110, rather than by the decompression pumps 110 alone. As a result, the sucked air per time is increased. The volume of the sucked air on an ambient pressure basis is a parameter of suction power. Use of the decompression tanks 109 enables the increase in the suction power from the side suction holes 103.

Now, imagine a case where the tape F is warped. When this tape F is set on the exposure stage 124, the side regions 119 of the tape F are farther away from the exposure stage 124 than the center region 117 thereof. Thus, air existing between the side region 119 (of the tape F) and the side part 123 (of the exposure stage 124) has a larger volume than air existing between the center region 117 (of the tape F) and the center part 122 (of the exposure stage 124). If the decompression pumps 110 and 116 draw air, then a pressure of air existing between the tape F and the exposure stage 124 is decreased. In response, the tape F is blown by air from the optical section, and it is moved toward the exposure stage 124. Finally, the tape F is pressed against the exposure stage 124. However, note that the spaces between the side regions 119 and the side parts 123 and between the center region 117 and the center part 122 communicate with the external. Hence, if the decompression pumps 110 and 116 draw air slowly, the pressure of air between the tape F and the exposure stage 124 does not become lower than the atmosphere. Thus, they must suck air quicker than the flow of the atmosphere.

In consideration of the above fact, there needs to be decompressors, each of which has suction power for sucking air of larger volume than air coming from the atmosphere. Furthermore, the air between the side region 119 and the side part 123 has a larger volume than that of the air between the center region 117 and the center part 122, when the tape F is warped. Accordingly, the suction power for sucking the air between the side region 119 and the side part 123 must be greater than the suction power for sucking the air between the center region 117 and the center part 122. Consequently, the decompression pump 110 needs to be coupled to the decompression tank 109 in order to increase its sucking power. With this decompression tank 109, the air between the side region 119 and the side part 123 is drawn quicker than the air between the center region 117 and the center part 122.

Moreover, the decompression pumps 110 may operate only before the tape F is sucked onto the exposure stage 124. Because of the operation, the decompression pumps 110 do not impose any overloads on the operation of the device 100.

As described above, each of the second decompressors coupled to the side suction holes 103 is adapted to produce greater sucking power than that of the first decompressor coupled to the central suction holes 113. In other words, assume that first power is power at which the central suction holes 113 of the center part 122 suck the center region 117 of the tape F, and that second power is power at which the side suction holes 103 of the side part 123 sucks the side region 119 of the tape F. In this case, the following relationship is established: the second power is greater than the first power.

In this structure, the center region 117 of the tape F is fixed on the exposure stage 124 firmly by the first power. Also, the side regions 119 which should float off the exposure stage 124 due to the warp of the tape F is also fixed on the exposure stage 124 by the second power, which is greater than the first power.

As shown in FIG. 4, after the tape F is fixed to the exposure stage 124, the blower 105 sends out the air 104 toward the tape F and the exposure stage 124, so that the tape F is moved toward the exposure stage 124. Consequently, a distance between the tape F and the exposure stage 124 is shortened, and the volume of air therebetween is decreased. Thus, the sucking power which is necessary for drawing the tape F onto the exposure stage 124 can also be decreased, thereby enabling the tape F to be fixed quickly. In addition, the pressure of the air 104 from the blower 105 may be increased in order to bring the warped tape F into surface contact with the exposure stage 124. By increasing the pressure of the air 104, the tape F can be brought into surface contact with the exposure stage 124. The sucking power of the first and second decompressors can be lowered by an amount at which the pressure of the air 104 is increased. This leads to the miniaturization of the decompression pumps 110 and 116.

(Example of Another Tape)

Figure 6A:
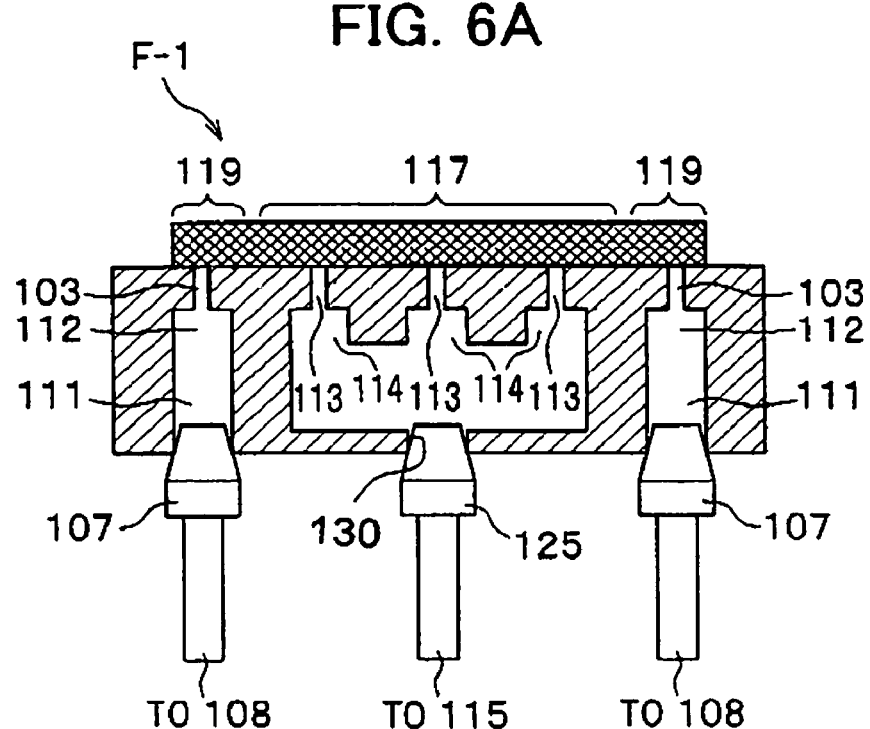
FIG. 6A is a cross-section view depicting the exposure stage while another tape is placed thereon.

The second embodiment has been described in the case where the tape F has the perforation holes 120 on both sides. However, the present invention is not limited to this configuration. Alternatively, the tape F may be of another type. Referring to FIG. 6A, a tape F-1 having no perforation holes is sucked onto the exposure stage 124. Even without perforation holes 120, the tape F-1 can be sucked thereon firmly. In this case, each of the side regions 119 occupies 10% or less of the whole surface area of the tape F-1.

Figure 6B:
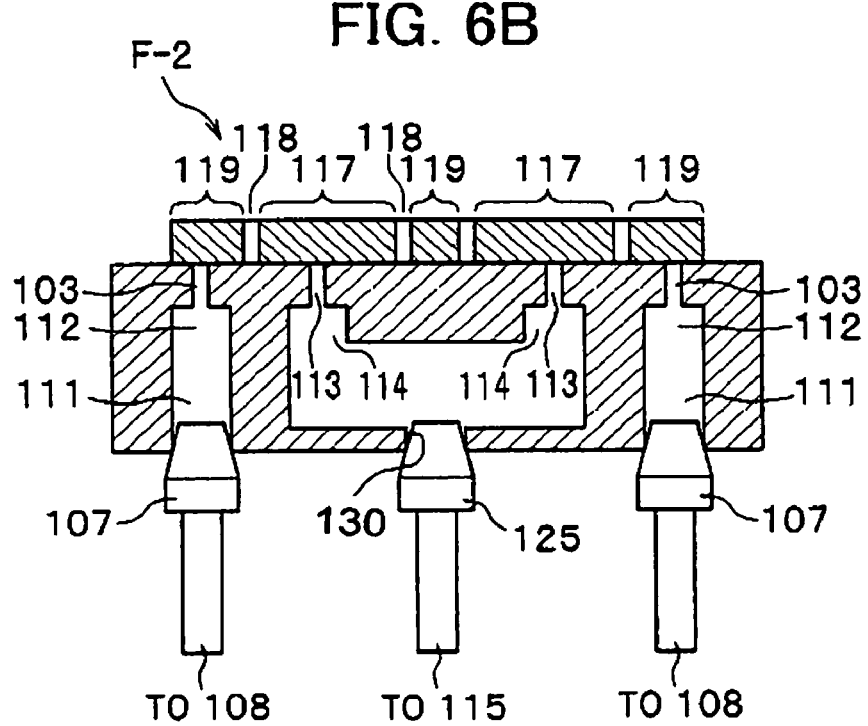
FIG. 6B is a cross-section view depicting the exposure stage while still another tape is placed thereon.

Next, referring to FIG. 6B, a tape F-2 having two pairs of lines each of which is composed of the perforation holes 120 is sucked onto the exposure stage 124. One pair out of the two pairs of lines of the perforation holes 120 is formed around the center of the tape F-2. Accordingly, even when the tape F-1 having no perforation holes is set on this exposure stage 124, the warp of the tape F-1 can be absorbed sufficiently.

Considering the case of FIG. 6B, the central suction holes 113 cannot be provided around the center of the exposure stage 124, because the pair of the perforation holes 120 is formed on the center of the tape F-2. Instead, the central suction holes 113 are formed on the respective centers of the regions 117 each of which is formed between the two lines of the perforation holes 120. In general, various types of tapes can be used in accordance with a certain application. Hence, an exposure stage of which central suction holes and side suction holes are adapted to an arrangement of the perforation holes 120 of the tape F may be selected.

(Operation of Projection Exposure Device)

A description will be given below, of an exposure process performed by the projection exposure device 100.

Assume that the tape F is already strung around the supply reel 141, guide rollers 142, 144, 148 and 150, transfer rollers 145 and 147, and take-up reel 151. Needless to say, any of the tape F, the tape F-1 and the tape F-2 may be applied to this exposure process.

Figure 7:
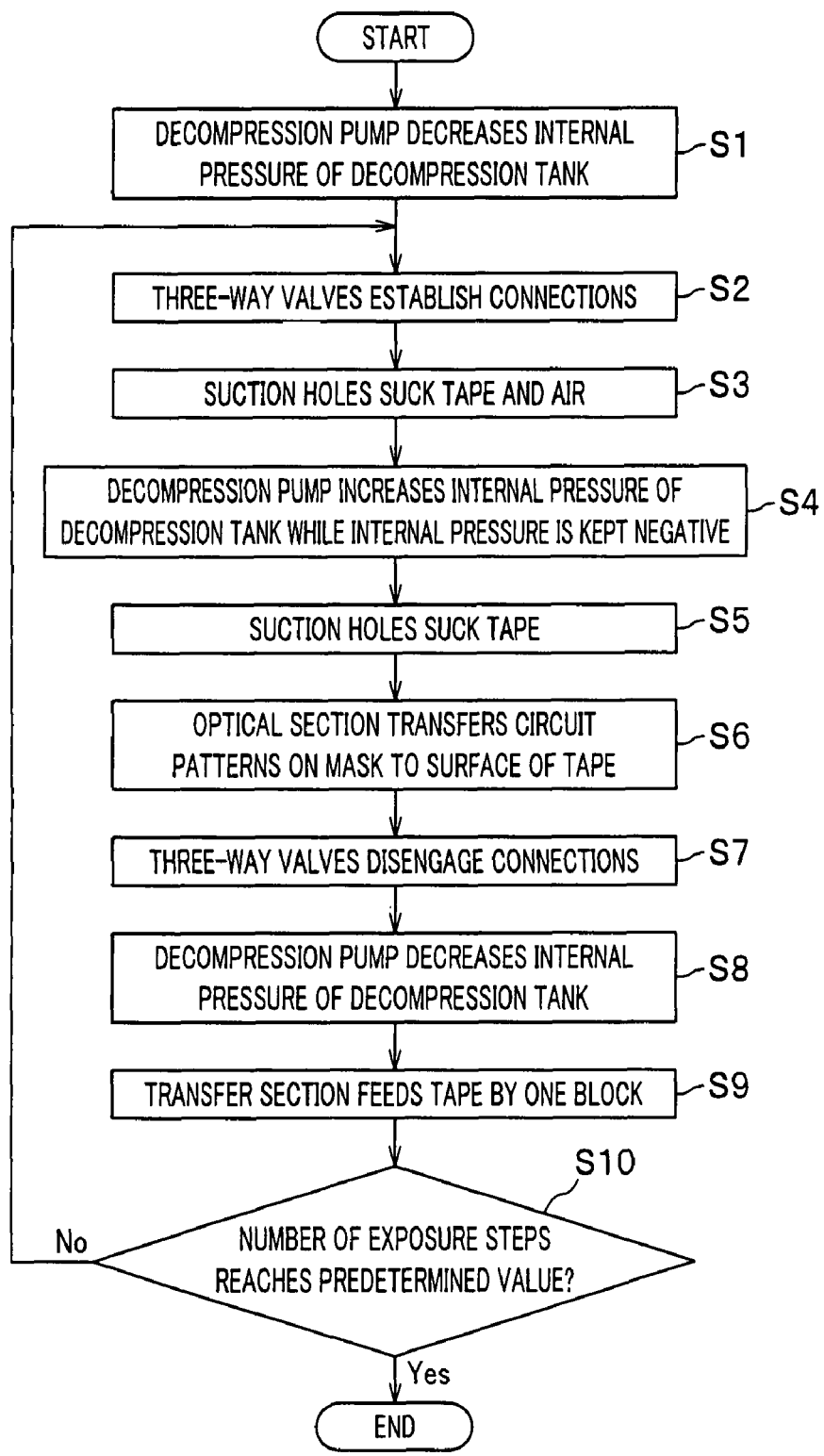
FIG. 7 is a flowchart of an exposure process performed by the projection exposure device of the second embodiment.
Figure 8:
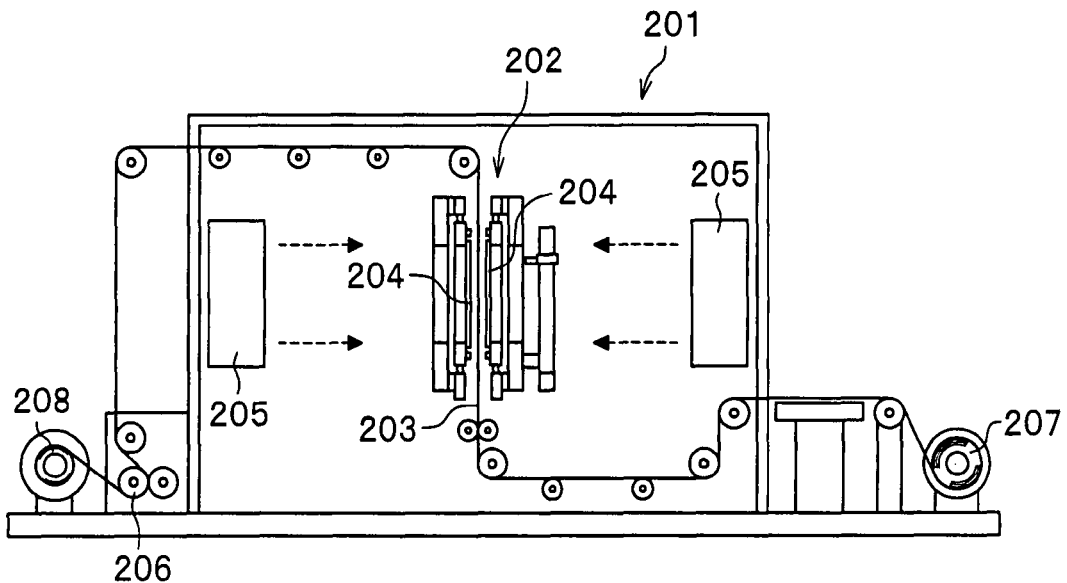
FIG. 8 is an elevation view depicting a projection exposure device of prior art.
Figure 9:
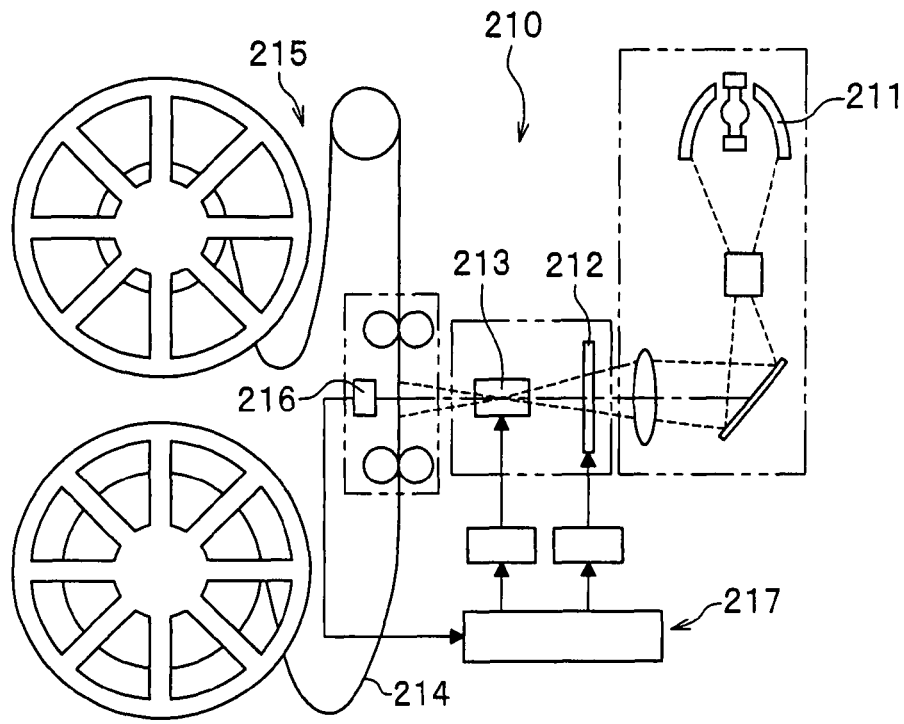
FIG. 9 is an elevation view depicting another projection exposure device of prior art.

Referring to a flowchart of FIG. 7, each decompression pump 110 decreases the internal pressure of the decompression tank 109 (step S1). Each three-way valve 108 establishes a connection between the decompression tank 109 and the side suction holes 103 of the exposure stage 124. At the same time, the three-way valve 115 establishes a connection between the central suction holes 113 and the decompression pump 116 (step S2). Regardless of whether the tape F is warped or not, the central suction holes 113 draw the tape F to the exposure stage 124. Subsequently, the side suction holes 103 suck the tape F as well as air between the exposure stage 124 and the tape F (step S3). Once the central suction holes 113 and the side suction holes 103 start sucking the tape F, the blower 105 sends out the air 104 to the tape F in order to bring the tape F into surface contact with the exposure stage 124. In other words, the air 104 from the blower 105 presses the tape F against the exposure stage 124. Simultaneously with the step S3, each decompression pump 110 increases the internal pressure of the decompression tank 109 while keeping the pressure negative (step S4). Note that as long as the internal pressure is negative, the side suction holes 103 keep sucking the tape F.

The side suction holes 103 and the central suction holes 113 continuously suck the side regions 119 and the center region 117 of the tape F, respectively (step S5). The blower 105 stops the air 104 before the tape F is exposed to light in order for the air 104 not to affect the device 100. Even during this period, the side suction holes 103 and the central suction holes 113 keep sucking the tape F. The control section aligns the mask M with the tape F, and the optical section projects the circuit patterns on the mask M to the surface of one block 121 (see FIG. 5A) of the tape F by irradiating it with light (step S6). The three-way valves 108 and 115 communicate the side suction holes 103 and the central suction holes 113 with the external, respectively (step S7). In response, the pressure within the side suction holes 103 and the central suction holes 113 become atmospheric pressure. Each decompression pump 110 decreases the internal pressure of the decompression tank 109 (step S8). The transfer section feeds the tape F by the one block 121 (step S9).

The device controller 138 determines whether or not the number of the above exposure steps reaches a predetermined value (step S10). If this number does not yet reach the predetermined value ("No" at the step S10), then the process returns to the step S2. Then, this process will repeat a routine from the step S2 to the step S10 until the number of the exposure steps reaches the predetermined value. Otherwise, if the number of exposure steps is the predetermined value ("Yes" at the step S10), then the process is over.

The decompression tank 109 assists the decompression pump 110 in producing the sucking power. However, if the decompression tank 109 constantly sucks the air, then its internal pressure is prone to increase, thus decreasing the sucking power generated by the decompression tank 109. Accordingly, whenever the tape F is fed by the one block 121, each decompression pump 110 decreases the internal pressure of the decompression tank 109, so that the sucking power generated by the decompression tank 109 is recovered. With this operation, the tape F can be sucked onto the exposure stage 124 by means of great sucking power.

With the above-described projection exposure device 100, the tape F can be fed stably to the exposure stage 124 and fixed thereon, regardless of the dimensions or conditions of the tape F. This makes it possible to transfer the fine circuit patterns on the mask M to the surface of the tape F with great precision.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A projection exposure device for transferring patterns formed on a mask to a surface of a film-shaped tape on an upright exposure stage by projecting the patterns onto the surface of the tape using light, said projection exposure device comprising:

the exposure stage on which the tape is to be fixed, the exposure stage comprising:

one or more central suction holes for applying first sucking power to a center region of the tape to which the patterns are to be formed, said central suction holes applied in such a way that the center region of the tape is drawn to the exposure stage, the center region of the tape extending in a feeding direction of the tape; and one or more side suction holes for applying second sucking power to each of side regions of the tape in such a way that the side regions of the tape are drawn to the exposure stage, the second sucking power being greater than the first sucking power, the side regions of the tape extending in the feeding direction of the tape;

wherein the tape has at least one pair of perforation lines each of which is made up of a plurality of holes arranged in the feeding direction, and the center region spans between the perforation lines and each of the side regions spans between one of the perforation lines and a nearer one of side edges of the tape;

a transfer mechanism for feeding the tape to the exposure stage vertically, and a projection optical mechanism for irradiating the surface of the tape with the light, the projection optical mechanism including Dyson optics located opposite the transfer mechanism across the exposure stage;

the Dyson optics having an optical axis being substantially perpendicular to the exposure stage;

the Dyson optics comprising:

an entrance side convex lens and an exit side convex lens, both centers of which are arranged on the optical axis;

a prism reflector located between the entrance side convex lens and the exit side convex lens;

a reflection side convex lens and a concave reflecting mirror that are both arranged above the prism reflector; and a lens body.

2. The projection exposure device according to claim 1, wherein the exposure stage is permitted to travel substantially parallel to the optical axis of the Dyson optics.

3. The projection exposure device according to claim 1, further comprising:

a tape surface location measurement unit for measuring a position of the surface of the tape on the optical axis, using a contact or noncontact type measurement tool, the tape surface location measurement unit being allowed to move to or escape from a region between the Dyson optics and the exposure stage; the tape surface location measurement unit being positioned adjacent to the optical axis upon measurement;

a mark capture unit for capturing an image indicating how long the tape shifts from the optical axis in directions perpendicular to the optical axis, the mark capture unit being allowed to move to or escape from the region between the Dyson optics and the exposure stage, the mark capture unit including a CCD camera and a half mirror, an image process unit for producing images of the alignment marks on the tape and on the mask and for determining a misalignment amount there-between; and a controller for allowing the exposure stage to move parallel to the optical axis, based on the position of the surface of the tape which has been measured by the tape surface location measurement unit, and for allowing the mask to move until the misalignment amount which has been determined by the image process unit is reduced to substantially zero.

4. The projection exposure device according to claim 1, wherein the transfer mechanism comprises:

a supply reel for feeding the tape;

first and second supply side guide rollers for guiding the tape from the supply reel;

a first tension adjuster for adjusting a tension of a portion of the tape that ranges between the first and second supply side guide rollers;

first and second transfer rollers for feeding, along the exposure stage, the tape from the second supply side guide roller, the first and second transfer rollers being arranged above and below the exposure stage, respectively;

first and second winding side guide rollers for guiding the tape from the second transfer roller;

a second tension adjuster for adjusting a tension of a portion of the tape that ranges between the first and second winding side guide rollers; and a take-up reel for winding the tape from the second winding side guide roller, wherein the supply reel, the first and second supply side guide rollers, the first tension adjuster, and the first transfer roller are all located above the second transfer roller, the first and second winding side guide rollers, the second tension adjuster, and the take-up reel.

5. The projection exposure device according to claim 1, further comprising:

a first decompressor for producing the first sucking power, the first decompressor being coupled to the central suction holes, and one or more second decompressors, each of which is for producing the second sucking power, the second decompressors being coupled to the side suction holes.

6. The projection exposure device according to claim 5, wherein each of the second decompressors comprises a decompression pump coupled to the side suction holes, and a decompression tank coupled to the side suction holes and to the decompression pump and having internal pressure to be decreased by the decompression pump.

7. The projection exposure device according to claim 1, further comprising a blower for sending out gas to the tape on the exposure stage from a side opposite to the central and side suction holes, after the center region and the side regions of the tape start being drawn to the exposure stage.

8. A projection exposure device for transferring patterns formed on a mask to a surface of a film-shaped tape on an upright exposure stage by projecting the patterns onto the surface of the tape using light, said projection exposure device comprising:

the exposure stage on which the tape is to be fixed, the exposure stage comprising:

one or more central suction holes for applying first sucking power to a center region of the tape to which the patterns are to be formed, said central suction holes applied in such a way that the center region of the tape is drawn to the exposure stage, the center region of the tape extending in a feeding direction of the tape; and wherein each of the side regions of the tape occupies less than 10% or less of a whole surface of the tape, one or more side suction holes for applying second sucking power to each of side regions of the tape in such a way that the side regions of the tape are drawn to the exposure stage, the second sucking power being greater than the first sucking power, the side regions of the tape extending in the feeding direction of the tape;
a transfer mechanism for feeding the tape to the exposure stage vertically, and
a projection optical mechanism for irradiating the surface of the tape with the light, the projection optical mechanism including Dyson optics located opposite the transfer mechanism across the exposure stage; the Dyson optics having an optical axis being substantially perpendicular to the exposure stage; the Dyson optics comprising:
an entrance side convex lens and an exit side convex lens, both centers of which are arranged on the optical axis;
a prism reflector located between the entrance side convex lens and the exit side convex lens;
a reflection side convex lens and a concave reflecting mirror that are both arranged above the prism reflector; and
a lens body.

9. The projection exposure device according to claim 8, wherein the exposure stage is permitted to travel substantially parallel to the optical axis of the Dyson optics.

10. The projection exposure device according to claim 8, further comprising:
a tape surface location measurement unit for measuring a position of the surface of the tape on the optical axis, using a contact or noncontact type measurement tool, the tape surface location measurement unit being allowed to move to or escape from a region between the Dyson optics and the exposure stage, the tape surface location measurement unit being positioned adjacent to the optical axis upon measurement;
a mark capture unit for capturing an image indicating how long the tape shifts from the optical axis in directions perpendicular to the optical axis, the mark capture unit being allowed to move to or escape from the region between the Dyson optics and the exposure stage, the mark capture unit including a CCD camera and a half mirror;
an image process unit for producing images of the alignment marks on the tape and on the mask and for determining a misalignment amount there-between,
and
a controller for allowing the exposure stage to move parallel to the optical axis, based on the position of the surface of the tape which has been measured by the tape surface location measurement unit, and for allowing the mask to move until the misalignment amount which has been determined by the image process unit is reduced to substantially zero.

\* \* \* \* \*